United States Patent
Van Liew et al.

(10) Patent No.: US 7,002,710 B1
(45) Date of Patent: Feb. 21, 2006

(54) HIGH RELIABILITY FORENSIC COLOR MARKING SYSTEM

(75) Inventors: Edward J Van Liew, Oceanside, CA (US); Nobuko M Nathan, Encinitas, CA (US); Birsen Ulupinar, La Jolla, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/546,247

(22) Filed: Apr. 10, 2000

(51) Int. Cl.
G06K 15/00 (2006.01)
G06K 15/02 (2006.01)
H04N 1/40 (2006.01)
G06F 3/12 (2006.01)

(52) U.S. Cl. .................. 358/3.28; 358/526; 380/51; 382/100; 382/232

(58) Field of Classification Search .......... 380/51; 358/526, 3.28; 382/100, 232
See application file for complete search history.

(56) References Cited

U.S. PATENT DOCUMENTS

| | | | |
|---|---|---|---|
| 4,723,149 A | 2/1988 | Harada | |
| 5,257,119 A * | 10/1993 | Funada et al. | 358/438 |
| 5,321,470 A | 6/1994 | Hasuo et al. | |
| 5,363,202 A | 11/1994 | Udagawa et al. | |
| 5,379,093 A | 1/1995 | Hashimoto et al. | |
| 5,426,710 A | 6/1995 | Suzuki et al. | |
| 5,444,518 A | 8/1995 | Hashiguchi et al. | |
| 5,481,377 A | 1/1996 | Udagawa et al. | |
| 5,481,378 A | 1/1996 | Sugano et al. | |
| 5,502,575 A | 3/1996 | Kai et al. | |
| 5,533,144 A | 7/1996 | Fan | |
| 5,539,539 A * | 7/1996 | Fujimoto et al. | 358/518 |
| 5,541,741 A | 7/1996 | Suzuki | |
| 5,557,412 A | 9/1996 | Saito et al. | |
| 5,557,416 A | 9/1996 | Sasanuma et al. | |
| 5,604,596 A | 2/1997 | Ukai et al. | |
| 5,621,503 A | 4/1997 | Komaki et al. | |
| 5,974,548 A | 10/1999 | Adams | |
| 6,044,182 A * | 3/2000 | Daly et al. | 382/284 |
| 6,345,104 B1 * | 2/2002 | Rhoads | 382/100 |
| 6,603,576 B1 * | 8/2003 | Nakamura et al. | 358/3.28 |
| 6,646,764 B1 * | 11/2003 | Wataya | 358/3.28 |
| 6,757,406 B1 * | 6/2004 | Rhoads | 358/3.28 |
| 2002/0090108 A1 * | 7/2002 | Rhoads | 382/100 |
| 2002/0164049 A1 * | 11/2002 | Rhoads | 382/100 |
| 2003/0035565 A1 * | 2/2003 | Rhoads | 382/100 |
| 2005/0036651 A1 * | 2/2005 | Wen | 382/100 |

FOREIGN PATENT DOCUMENTS

| EP | 0946039 A1 | 9/1999 |
|---|---|---|
| TW | 364957 | 7/1999 |
| TW | 89124046 | 4/2002 |

* cited by examiner

*Primary Examiner*—Edward Coles
*Assistant Examiner*—David L Jones

(57) ABSTRACT

A forensic marking system and method for identifying the printing device on which a medium was printed. Encoded forensic markings which identify the device but are of low perceptibility to the human eye are superimposed on the printed image. The markings have a color, size, density, and repetition pattern that only minimally affect print quality while providing highly accurate identification of the printing device, even if the printed medium contains high-density image content.

37 Claims, 10 Drawing Sheets

DEFINITIONS:
START/STOP = COMMON REPEATED PATTERNS IN EACH MATRIX
TYPE X = MACHINE TYPE IDENTIFIER
CHECK X = CHECKSUM BITS
MACH = MACHINE SERIAL NUMBER ENCODING CELLS

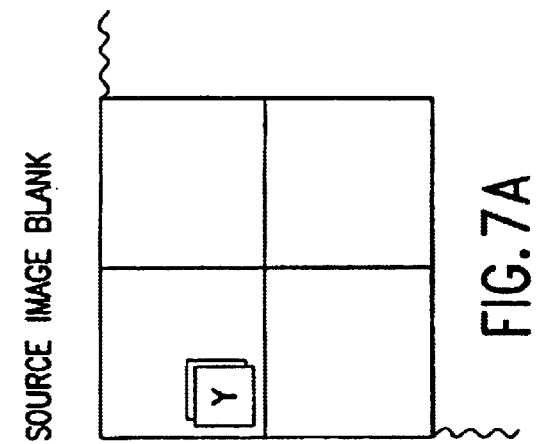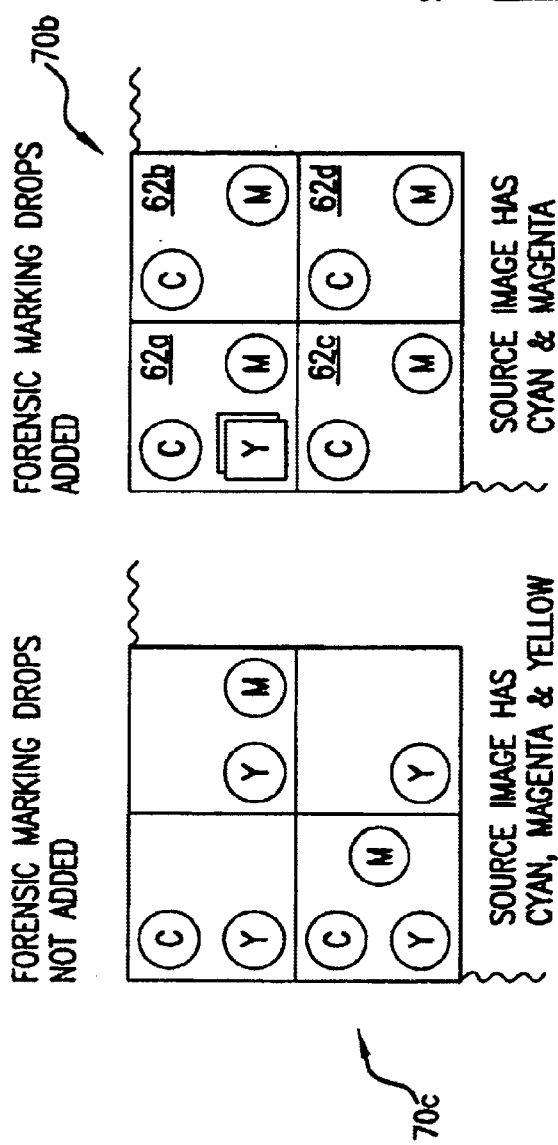

HIGH RELIABILITY FORENSIC COLOR MARKING SYSTEM

FIELD OF THE INVENTION

The present invention relates generally to printing with color printing systems. It relates more particularly to a forensic marking system for color printers that accurately identifies the printer on which the output was printed, while minimizing the perceptibility of the forensic markings to the human eye.

BACKGROUND OF THE INVENTION

Over the past several years, the quality of color images produced by computer printers such as inkjet printers and color laser printers has improved to the point where such images now rival those achievable through color photography. In addition, many such printers are capable of printing on a wide range of media, including paper stocks of various qualities, sizes and thicknesses. When an optical scanner is used in combination with a printer and the appropriate print media, original documents can be scanned and printed to produce copies which can be difficult to distinguish from the original. The scanner can be a separate peripheral device, or can be combined with the printer in a single "all in one" peripheral device, such as the OfficeJet™ Pro Series product family from Hewlett-Packard Company, the assignee of the present application. "All in one" devices, which may be connected to a computer or may be used as a stand-alone color copier without requiring an attached computer, commonly include an ink jet based printing system that has a removable printer cartridge. Others have laser printing based systems. An optical scanning system is also provided. A user can scan a document with the scanning system and then print the document with the printing system. Image information can also be transmitted to and received from an attached computer. In some instances, a modem is provided to allow scanned text and other images to be transmitted via facsimile over telephone lines to a remote location.

At the same time as the color image quality obtainable from scanner-printer configurations has improved, the cost of these devices has decreased making them more widely available and more readily accessible. This increased copy quality and device accessibility has raised concerns about the proliferation of illegal counterfeiting of documents such as paper currency, negotiable instruments, identification papers, and the like. A related concern is the undesired copying of proprietary or confidential business documents intended for only limited distribution.

Two general classes of solutions to these problems have been developed. The first type, "active" counterfeit prevention systems, attempt to recognize during the scanning process documents which should not be copied, and if such a copy-prohibited document is detected, prevent the printing of a copy. Such systems require advance knowledge of the image characteristics of the types of documents that are not to be copied, and must reliably detect these documents when copying of them is attempted. As a result, they tend to be expensive, in part because accurate determination of prohibited versus acceptable originals is difficult, and also because the system must be programmed to recognize each type of document intended to be protected.

The second general class of systems are "passive" marking systems. Such systems tend to be less complex in part because they do not attempt to prevent the copying of certain documents, but rather imprint all copies they produce with additional forensic information. Frequently this forensic information will identify the manufacturer, model number, serial number, or owner of the device, thus allowing the source of a particular printed copy to be traced to a particular system or person. However, since it is likely that most printed copies produced by the system will be of perfectly legitimate documents, it is highly desirable that the forensic information be virtually unnoticeable to the unaided human eye, in order to avoid undesirably degrading the print quality of the copy. As a result, the size, pattern, location, repetition, and color of the forensic markings must be carefully designed so as to ensure that the markings are imprinted in as visually unobtrusive a manner as possible. At the same time, the forensic markings must also be readily detectable and accurately interpretable so as to identify the device on which the copy was printed to be determined from the printed copy with near-perfect accuracy, should the genuineness of a document be called into question and thus its origin determined.

Some previous passive marking systems print small forensic markings in blank areas of the image. However, when the print density of a page is sufficiently high, such as when a photographic image is printed, there may not be enough remaining blank space to accommodate sufficient forensic markings to ensure accurate recognition. Other previous passive marking systems print forensic markings in a color, frequently yellow, which is not readily perceived by the human eye. As a result, these systems do not necessarily require blank image space for the forensic markings, but rather they may print the yellow markings in regions of the media that also contain the image. However, since the image itself may already contain yellow image content, forensic markings overlaid in these regions may be corrupted to such a degree that they misidentify the copying device, unless a mechanism exists to validate the markings.

Consequently, there is still a need for a passive marking system which minimizes the impact of forensic markings on print quality by forensically marking the printed medium with a small amount of imperceptible information overlaid on the image content, while ensuring that the passive marking system that produced the printed medium can accurately be identified from the forensic markings.

SUMMARY OF THE INVENTION

In a preferred embodiment, the present invention provides a forensic marking system that unobtrusively marks printed media with encoded system information which subsequently allows the system on which the media were printed to be identified from the media with a high degree of accuracy, even where the markings are superimposed on other image content on the media. Such a marking system serves as a deterrent to counterfeiting of valuable documents by allowing the counterfeited materials to be traced back to their source.

The preferred forensic marking system has a processor which superimposes onto source data representing the image to be printed at least one forensic marking. The source data may be provided to the marking system in electronic form from a data interface coupled to the processor. In some embodiments, the forensic marking system may also include a scanner coupled to the processor for acquiring the electronic source data by optically scanning a source image contained on a printed medium. The forensic marking contains an information marker which identifies the system, and an checksum marker which validates the integrity of the information marker. The system also includes a printer coupled to the processor which receives the combined source data and forensic markings, and prints each forensic marking on the resulting image using a predetermined color which has a low visual response to the human eye, but which is readily detectable by electronic scanning so that the system on which the marked image was printed can be accurately identified, even where a portion of the source data and a portion of a forensic marking are printed in the same image pixels. The marking system of the preferred embodiment prints images using cyan, magenta, and yellow colorant, with the forensic markings superimposed in yellow. The forensic marking may also include at least one location marker which locates the forensic marking on the printed medium. The rectangular forensic marking of the preferred embodiment uses two location markers, a first location marker located at one corner of the marking, and a second location marker different from the first location marker located at the diagonally opposite corner of the marking. In some embodiments, the forensic marking may additionally include at least one camouflage marker containing a randomized data pattern in order to reduce the perceptibility of the forensic marking where it is replicated in multiple locations on the printed medium. The perceptibility of the forensic markings may additionally be reduced by rotating some of the markings on the medium by a multiple of 90 degrees. In the preferred embodiment, the rectangular array of the forensic marking is a sixty-four pixel by sixty-four pixel matrix, which is organized into sixty-four eight pixel by eight pixel cells. Colorant for the forensic marking is deposited during printing in at most one pixel of each of the eight pixel by eight pixel cells. This results in a maximum print density of the forensic marking within the rectangular array of approximately 1.5 percent, which avoids any significantly degradation of the image quality. In the preferred embodiment, the forensic marking is replicated on the printed medium at 256 pixel-row and pixel-column intervals. In addition, adjacent forensic markings are offset from each other by a one pixel-row.

The present invention may also be implemented as a method for printing a forensically marked image with a printer. The forensic marking is printed using a predetermined color such as yellow which is difficult to detect by the human eye, but readily detectable by electronic scanning so as to identify the system. Such a method encodes system information identifying the printer into an information marker, calculates a checksum for the information marker, encodes the checksum into a checksum marker, superimposes at least one encoded forensic marking containing the information marker and the checksum marker onto source data so as to create forensically marked output data, and prints that output data on a print medium. In some embodiments, the method also adds to each forensic marking at least one location marker which identifies the location and rotation of the corresponding marking on the print medium. The forensic marking may also include at least one camouflage marker containing a randomized data pattern to reduce the visibility of the forensic markings replicated on the printed medium. In cases where the printer prints a swath of the image on the medium at a time, the invention may also embodied in a method which obtains a swath of image data for the source image, and if more than a threshold amount of color data exists in the swath of image data, superimposes onto the image data a swath of at least one forensic marking having an encoded pattern of image pixels in graphical form. Then the method prints the image data on the medium to produce a forensically marked image. This method may be repeated until all the swaths of image data are printed.

Typically the method will be performed by the processor of the printing system.

Another embodiment of the present invention is a system for determining a device on which a printed medium was printed. The system has a media receptor which receives the printed medium, an image scanner in optical communication with the media handler for acquiring multicolor image data for the printed medium, a color separation unit coupled to the image scanner for segregating predetermined color image data from the multicolor image data, and a forensic identification unit coupled to the color separation unit for identifying forensic markings in the predetermined color image data placed on the printed medium by the device when the medium was printed. The forensic identification unit has a locator subsystem which locates individual forensic markings in the predetermined color image data, a validation subsystem which analyzes an individual forensic marking so to verify its integrity, and an identification subsystem which analyzes the individual forensic marking to identify the device on which the printed medium was printed.

Yet another embodiment of the present invention is a method of determining the printing device on which a forensically marked printed image was printed. The printed image is color separated to isolate the image data for the predetermined color in which the marking was printed, and then the image data is scanned to locate a forensic marking. A checksum for the encoded information marker is calculated, and then compared with the printed checksum obtained by decoding the checksum marker. If the calculated checksum and the printed checksum match, then the validity of the particular forensic marking is assured, and the information marker is decoded to determine the printing device on which the image was printed. If the two checksum do not match, another forensic marking can be located and analyzed for validity.

In still another embodiment, the information marker of the forensic marking can alternatively or additionally indicate whether copying of the forensically marked image is allowable or prohibited. If the printing system determines that the source image contains a forensic marking with an information marker indicating that the source image should not be copied, the printer will be disabled and a printed copy will not be produced.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 7A–7C are schematic representations of the colorant deposited in four-pixel portions of forensic markings added to an exemplary image printed by the system of FIG. 1.

DESCRIPTION OF THE PREFERRED EMBODIMENT

Figure 1:
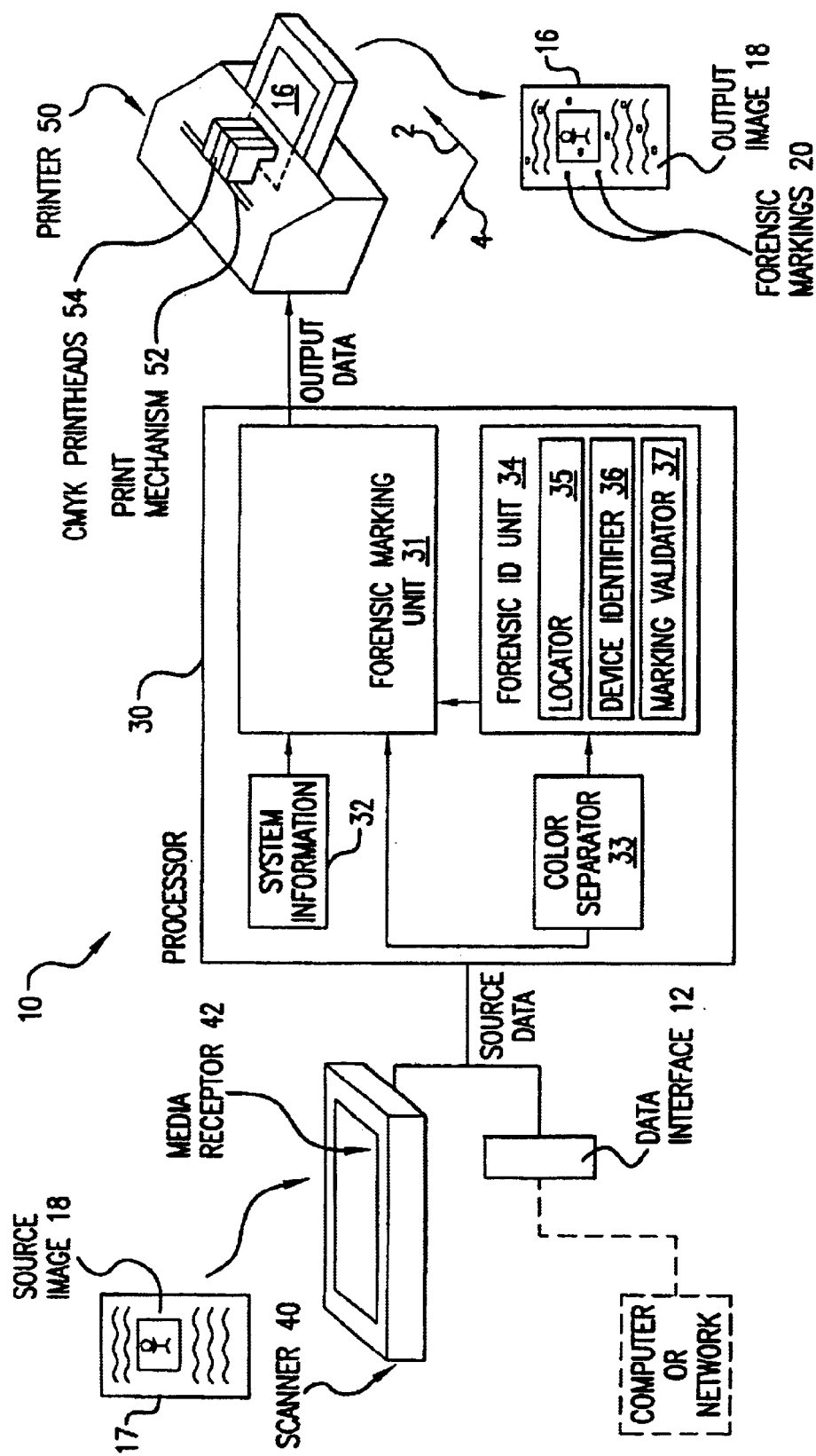
FIG. 1 is a schematic representation of a passive marking printing system embodying the present invention.
Figure 2B:
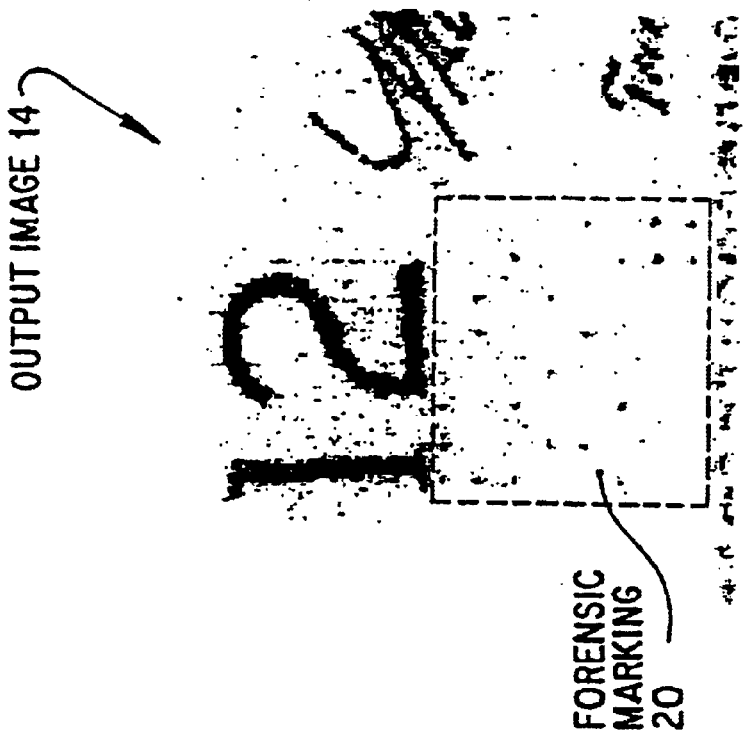
FIG. 2B is an example output image produced by the passive marking printing system of FIG. 1 for the example source image of FIG. 2A.
Figure 2A:
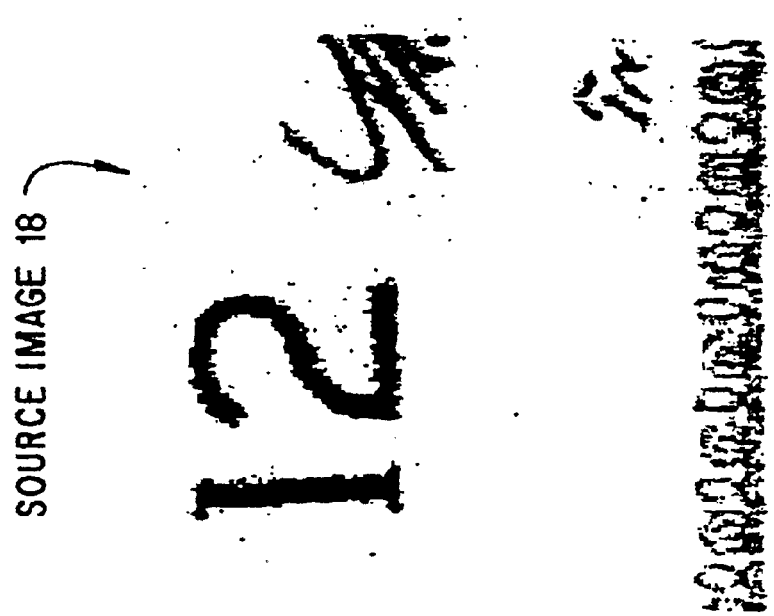
FIG. 2A is an example source image associated with the passive marking printing system of FIG. 1.

Referring now to the drawings, and more particularly to FIGS. 1, 2A, and 2B, there is illustrated a passive marking printing system 10 constructed in accordance with the present invention which adds to output images 14 printed on a medium 16 encoded forensic markings 20 capable of identifying the printing system 10. The system 10 advantageously minimizes the impact of these forensic markings 20 on print quality by marking the printed medium 16 with a small amount of imperceptible information overlaid on the image content, while ensuring that the system 10 that produced the printed medium 16 can be identified with a high degree of accuracy from the forensic markings 20 on the printed medium 16.

A preferred embodiment of the printing system 10 includes a processor 30 for superimposing onto source data at least one forensic marking 20 having an encoded pattern of image pixels in graphical form so as to create output data corresponding to the forensically marked output image 14. The source data is preferentially provided to the processor 30 either in electronic form via a data interface 12, or from an optical scanner 40 electrically connected to the processor 20 which acquires the source data from a source image 18. The construction and operation of optical scanners is well known to those skilled in the art, and is described in further detail in articles in the *Hewlett-Packard Journal* ["Designing a Scanner with Color Vision" (August 1993, p.52), and "Design of a 600-Pixel-per-Inch, 30-Bit Color Scanner" (February 1997, p. 54)], which are hereby incorporated by reference in their entirety. The preferred embodiment also includes a printer 50 electrically coupled to the processor 30 for printing the output data so as to produce the forensically marked image 14. As will be discussed subsequently in further detail, the, forensic markings 20 are printed at certain locations, intervals, and orientations on the forensically marked image 14 using a color to which the human eye has a low visual response, but one which is readily detectable by electronic optical scanning. A preferred embodiment of the printer 50 is a color inkjet printer which includes a print mechanism 52 which uses cyan, magenta, yellow, and black colorant print cartridges 54 in order to print color images 14. Typically a color inkjet printer 50 prints a horizontal portion, or swath, of an image 14 on the print medium 16 as the print cartridges 54 are scanned across the surface of the medium 16 in a scan direction 2. The construction and operation of color inkjet printers is well known to those skilled in the art, and is described in further detail in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994)], which are hereby incorporated by reference in their entirety. In the preferred embodiment, yellow colorant is used for printing all of the forensic markings 20, because the unaided human eye is less sensitive to the color yellow, particularly when printed on a white or light-colored background. Because optical scanning performs color separation, as will also be discussed subsequently in further detail, portions of the forensic markings 20 may be superimposed on the output image 14 even in regions which also contain portions of the source image.

Figure 3:
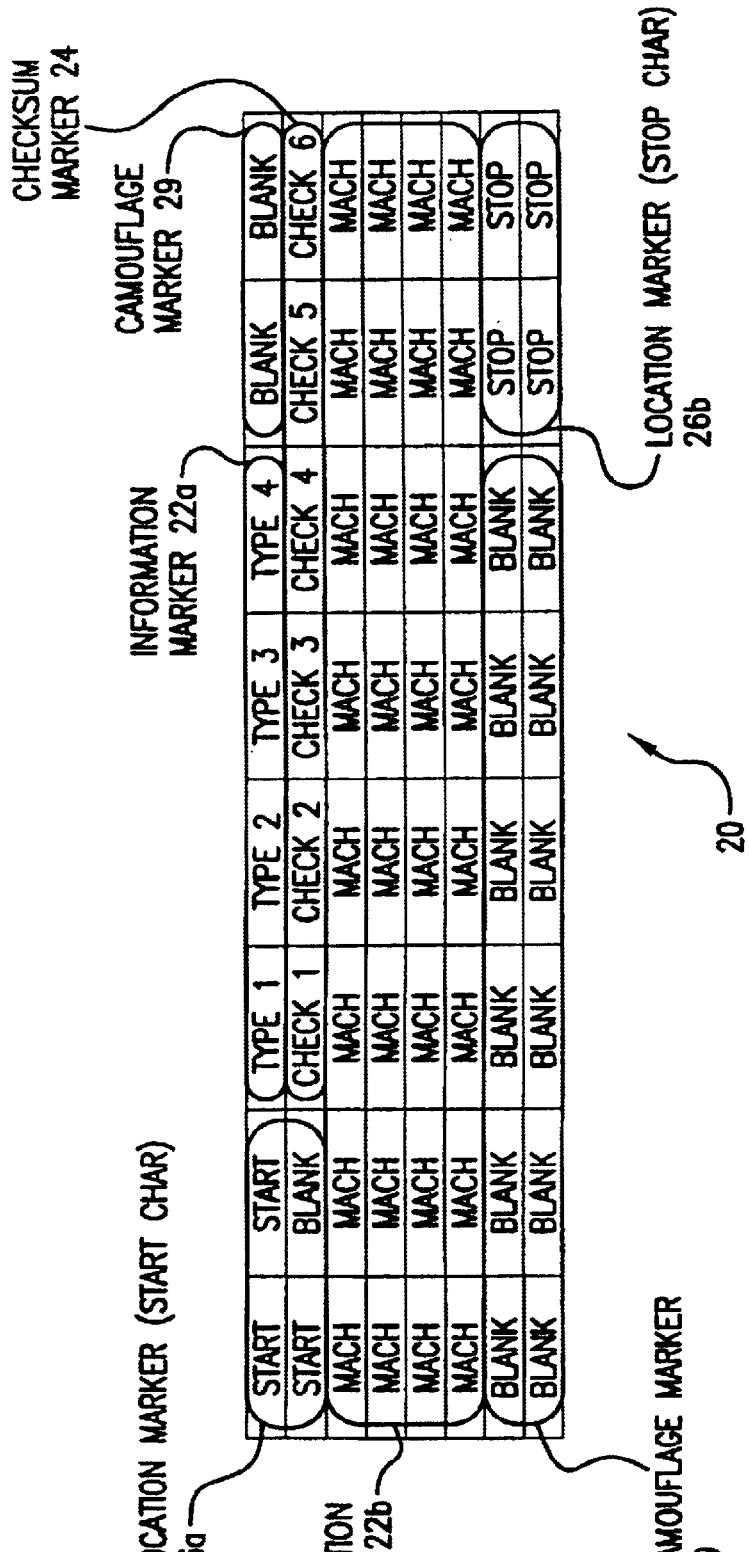
FIG. 3 is a schematic representation of a forensic marking produced by the printing system of FIG. 1.
Figure 4:
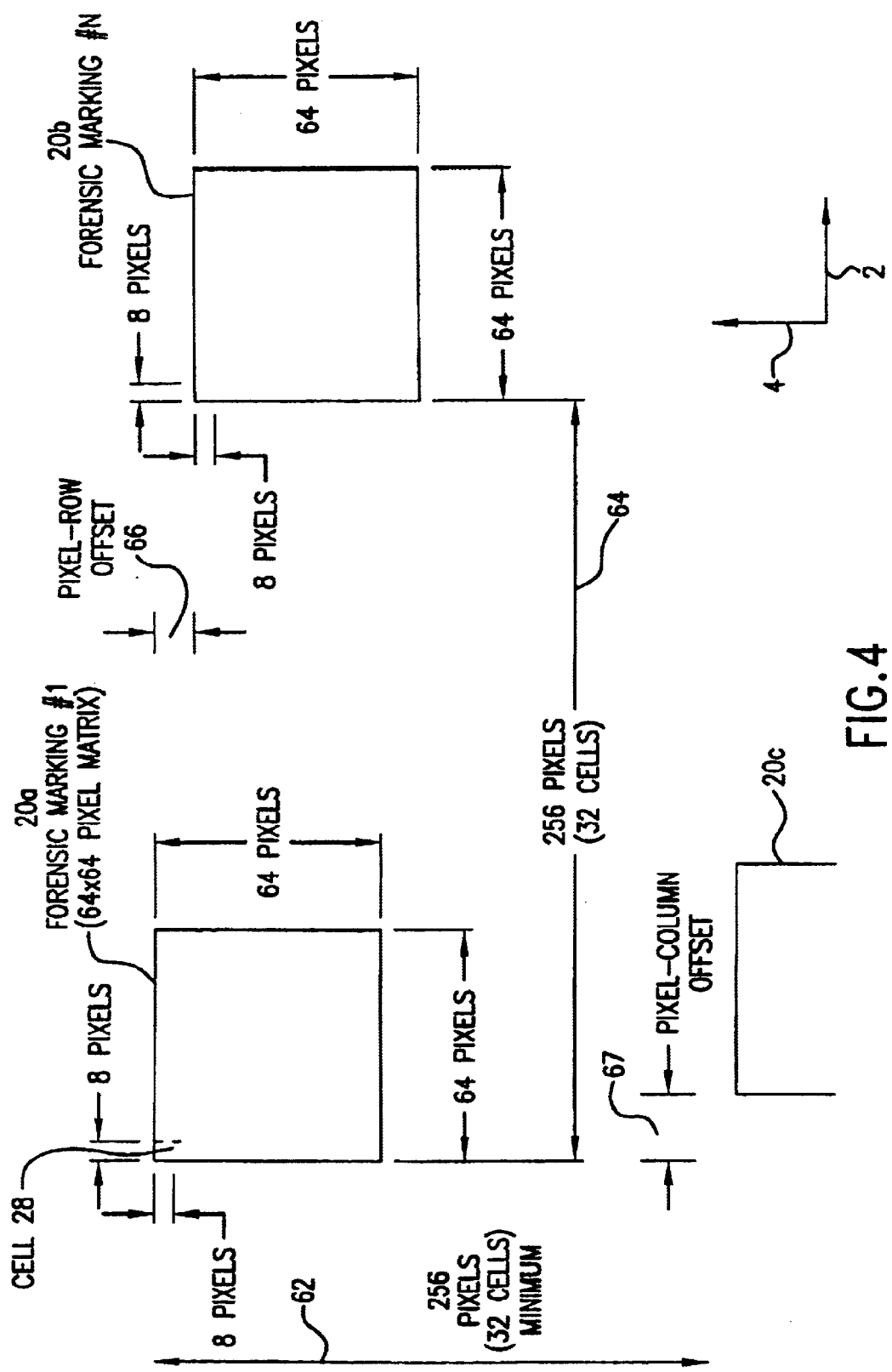
FIG. 4 is a schematic representation of the replication of forensic markings produced by the printing system of FIG. 1 on a printed output medium indicating the placement of multiple markings on the medium.
Figure 5:
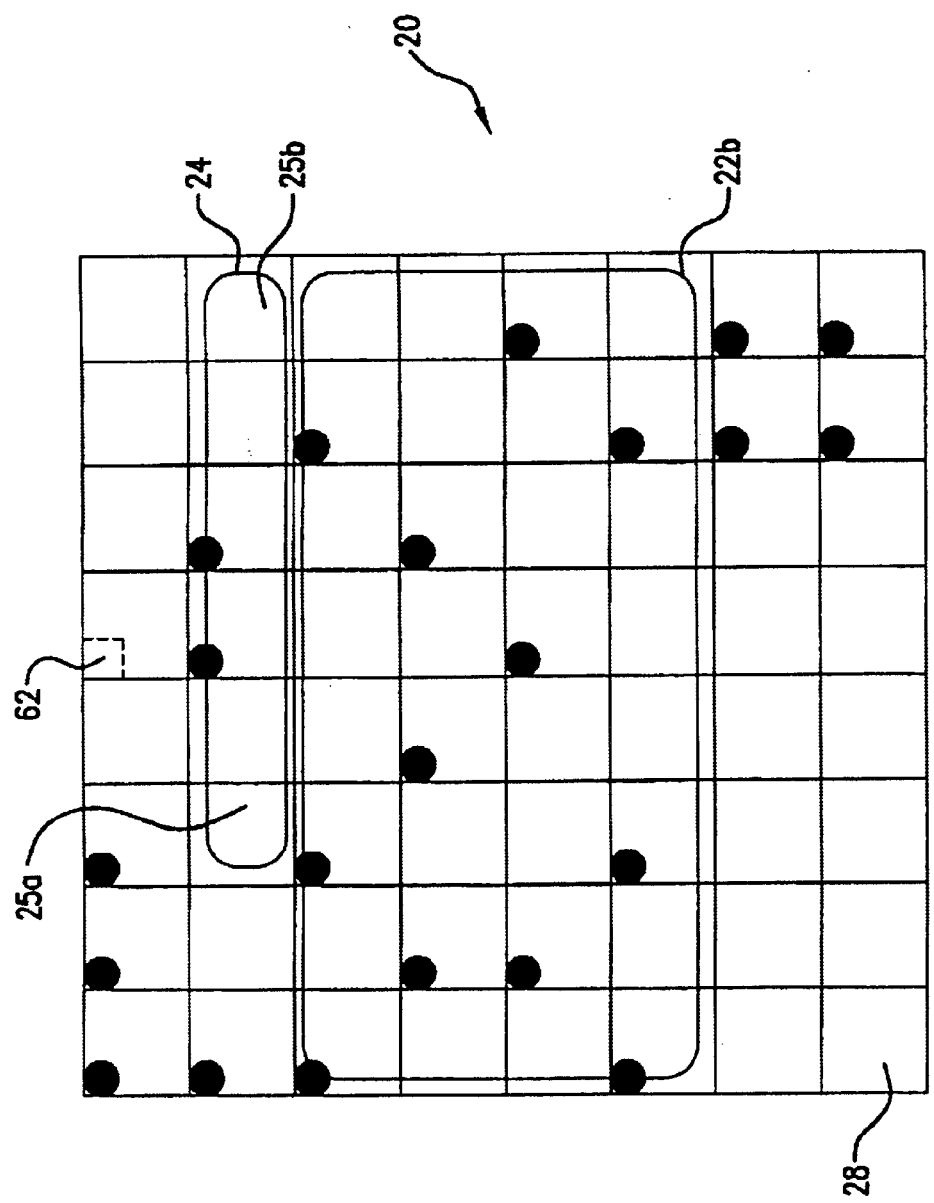
FIG. 5 is an enlarged example forensic marking produced by the passive marking printing system of FIG. 1.

Considering now the layout of the forensic markings 20 in further detail and with reference to FIGS. 3, 4, and 5, each forensic marking 20 of the preferred embodiment is organized as an eight row by eight column matrix of sixty-four cells, such as a cell 28. Each cell 28, in turn, is preferably organized as an eight row by eight column matrix of sixty-four pixels, such as a pixel 62. Therefore, each marking 20 is also a sixty-four pixel-row by sixty-four pixel-column matrix. Each pixel 62 is a programmatically selectable printable location on the medium 16. In addition to the use of yellow colorant, the perceptibility of the marking 20 to the human eye is further reduced by printing each marker cell 28 as a sparse matrix, with colorant being superimposed in at most one of the sixty-four pixels in each cell 28. This pixel is preferentially located at the same position within each cell—for example, the upper left corner—to provide uniform spacing between marked pixels. Therefore, the maximum print density of the forensic marking within the rectangular array is approximately 1.5 percent. In the preferred embodiment of a color inkjet printer, two drops of yellow ink are used as the colorant for a pixel. While the single drop per cell embodiment just described is preferred, the present invention also contemplates depositing additional drops per cell, in order to allow more complex encoding patterns at the expense of increased print density.

Considering now the content of the forensic markings 20 in further detail, each forensic marking 20 contains a plurality of markers. Each forensic marking 20 includes an information marker 22 indicative of the system 10, and a checksum marker 24 indicative of the information marker 22. Each forensic marking 20 also includes at least one location marker 26 which locates and orients the marking 20 on the printed medium 16 as will be discussed in further detail subsequently. Each marker 22,24,26 spans one or more cells 28. The cells 28 of a marker may all be contiguous, or a marker may be split into two or more sections of cells 28. Each marker 22,24,26 is printed on the medium 16 in graphical form as an encoded cell pattern.

In the preferred embodiment, the information marker 22 contains sufficient information to identify the system 10 which printed the output medium with a high degree of certainty. Identification information can include any of the manufacturer, model number, serial number, and purchaser or owner of the printing system 10. This information is encoded in the marker 22 and printed using a particular binary code. The information marker 22 of the preferred embodiment includes a machine type identifier section 22a to encode the type of system 10, and a machine serial number identifier section 22b to encode the serial number of the system 10. High accuracy identification of the system 10 is important in cases where a prohibited source image such as currency was illegally copied, in order not to misidentify an alleged counterfeiter. The checksum marker 24 contributes to high accuracy identification by providing redundancy to ensure that all information-bearing pixels of the marking were printed correctly. In the preferred embodiment, the checksum marker 24 encodes the total number of cells used to encode the information marker 22. For example, in the exemplary forensic marking 20 of FIG. 5, twelve cells 28 are printed out of the thirty-two total cells in the serial number section 22*b* of the information marker. Therefore, a corresponding binary value of twelve is encoded in the checksum marker 24 (where cell 25*a* represents the least significant bit of the checksum, and cell 25*b* represents the most significant bit of the checksum). When a printed forensic marking 20 is analyzed to identify the system 10, the checksum marker 24 is compared to the decoded information marker 22. If the two do not match, the present marking 20 will be ignored and another marking decoded instead.

In an alternate embodiment of the present invention which has characteristics of an active counterfeit prevention system, the information marker 22 may contain a "copy prohibit" control flag alternatively or in addition to the identification information. The operation of a copier upon detection of this control flag will be discussed subsequently.

Considering now the at least one location marker 26 in further detail, the marker 26 contains a notable pattern which allows the location of the corresponding forensic marking 20 to be precisely determined. In the preferred embodiment, a location marker 26 encompasses a two by two cell matrix. In addition, each forensic marking 20 of the preferred embodiment has two location markers 26, a start location marker 26*a* located at one corner periphery of the forensic marking, and a stop location marker 26*b* having a different encoded pattern from the start location marker 26*a* located at the diagonally opposite corner periphery of the forensic marking 20. The stop marker 26*b* contains four cells with identical patterns, while the start marker 26*a* has three cells with identical patterns and one blank cell. By positioning two different location markers at opposite corners, and by ensuring that the four cells in each of the other two corners of the forensic marking 20 do not contain either the start marker 26*a* or stop marker 26*b* patterns, the forensic marking 20 can be reliably identified by electronic scanning regardless of the orientation of the source image 18 on the media receptor 42 of the scanner 40.

Considering now the placement of the forensic markings 20 on the forensically marked image 14, and as best understood with reference to the exemplary illustration of FIG. 4, in the preferred embodiment the markings 20 (such as markings 20*a*, 20*b*, and 20*c*), are replicated at certain locations, intervals, and orientations so as to provide a plurality both to provide redundancy so as to improve the accuracy of printing system 10 determination in the event some of the markings 20 are corrupted, as well as to ensure that the markings 20 cannot easily be cut out of a printed medium 16 before making a subsequent copy of it so as to defeat the forensic marking scheme. As will be discussed subsequently in greater detail, superimposing portions of the forensic markings 20 in regions of the output image 14 which also contain portions of the source image 18 further reduces the ability to cut out forensic markings 20 without also cutting out a corresponding portion of the source image 18. The replicated markings 20*a*,20*b*,20*c* are located at predetermined pixel-row intervals 62 and pixel-column intervals 64 relative to each other. In the preferred embodiment and as depicted in FIG. 4, the pixel-column interval 64 is 256 pixels, which is equivalent to 32 cell-column intervals. The pixel-row interval 62 is 256 pixels (32 cell-rows) minimum; in the preferred embodiment any individual pixel-row interval 62 may be increased as required to avoid splitting forensic markings 20 between adjacent horizontal swaths. Horizontally adjacent forensic markings are offset from each other by a predetermined number of pixel-rows. The preferred embodiment uses a pixel-row offset 66 of one. In addition, vertically adjacent forensic markings are offset from each other by a number of pixel-columns. In the preferred embodiment, the pixel-column offset 67 is randomized for different horizontal swaths of the printed medium 16, so as to minimize patterning of the forensic markings 20 that might make the markings 20 more perceptible to the human eye. Other choices of pixel-row and pixel-column intervals and offsets, both predetermined or randomized, are possible using the present invention.

Figure 6:
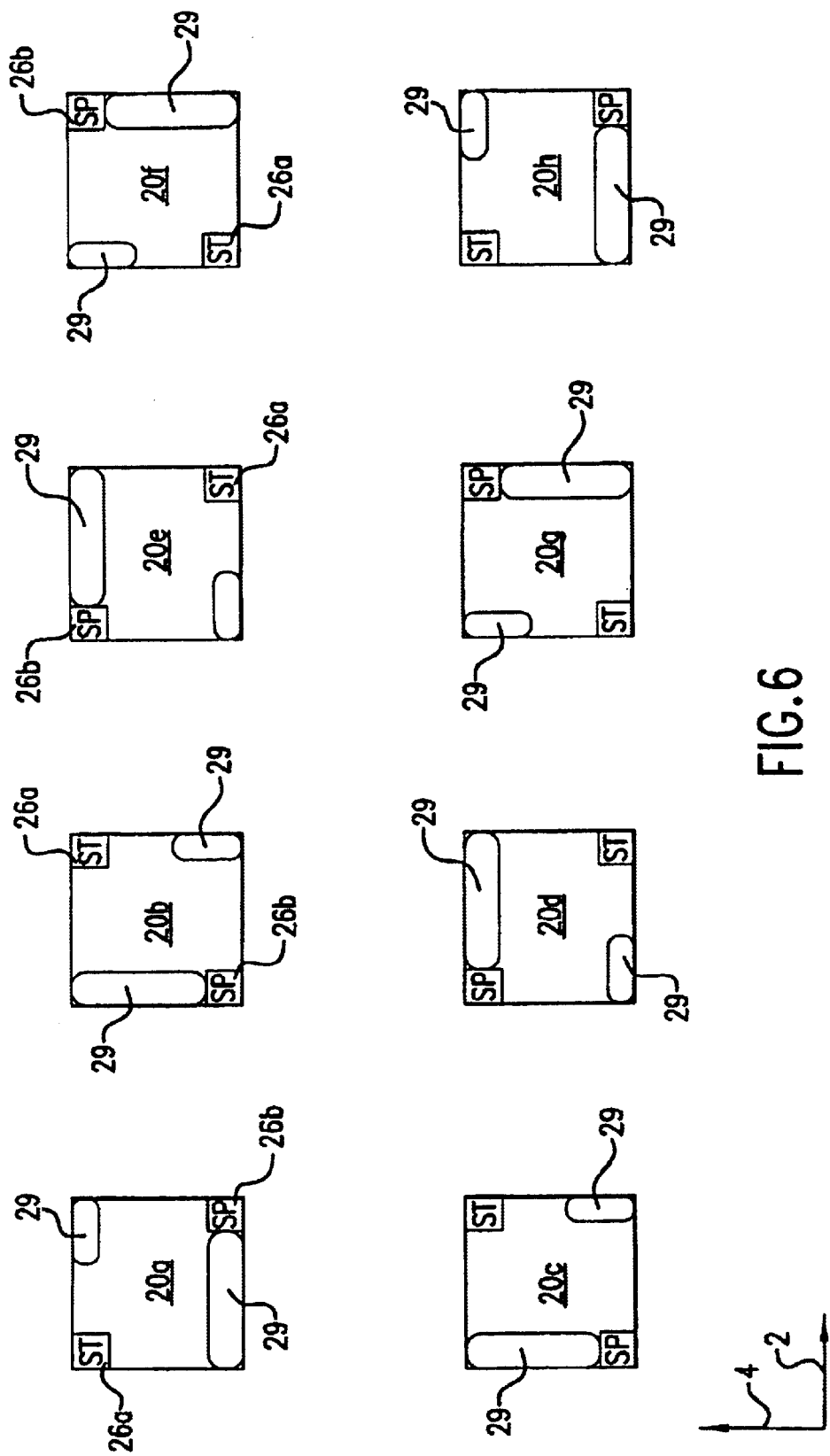
FIG. 6 is a schematic representation of the replication of forensic markings produced by the printing system of FIG. 1 on a printed output medium indicating an example orientation of the different markings on the medium.

Alternate embodiments employ additional mechanisms to further reduce the perceptibility of a pattern of identical replicated forensic markings 20*a–h* by the unaided human eye. As best understood with reference to FIG. 6, some of the forensic markings 20 may be printed in an orientation which is rotated from certain others of the forensic markings by a multiple of substantially ninety degrees. In the exemplary illustration of FIG. 6, each forensic marking 20*a–h* is rotated by ninety degrees from the adjacent marking 20*a–h* in both the scan direction 2 and the media advance direction 4. Other rotation placements, such as randomly selecting a multiple of ninety degree rotation for each adjacent marking 20*a–h*, can alternatively be used. The forensic marking 20 also contains at least one camouflage marker 29 which can be used to further reduce the perceptibility of a pattern of identical replicated forensic markings 20*a–h* by the unaided human eye. Each camouflage marker 29 has one or more cells which do not contain either location, checksum, or system information. While in the preferred embodiment these cells are left blank so as to minimize print density of the marking 20, in alternate embodiments they may be printed with random data so as to make at least some of the forensic markings 20*a–h* different from others. In addition, while the exemplary illustrations of FIGS. 3 and 6 show a forensic marking 20 having two camouflage markers 29 located as shown, different numbers and locations of camouflage markers 29 within the forensic marking 20 is contemplated by the present invention.

Considering now the superimposing of the forensic marking 20 on the source image 18 in further detail, and with reference to the exemplary marking patterns of FIGS. 7A, 7B, and 7C, there are illustrated three examples of a four-pixel portion 70*a–c* of a forensic marking cell 28. The upper left pixel 62*a* of each cell portion 70*a–c* denotes the pixel of the cell 28 into which yellow colorant can be deposited to form the forensic marking 20, while the remaining pixels 62*b–d* will not receive any colorant for the forensic marking 20. All four pixels of cell portions 70*a–c* may be imprinted using the appropriate combination of cyan, magenta, yellow, and black colorants as required to render the source image 18. Cell portion 70*a* illustrates the case where the source image is blank in this portion. In this case, if the cell 28 is to be forensically marked, two drops of yellow colorant (indicated by the two rectangular markings) are deposited into pixel 62*a*. Cell portion 70*b* illustrates the case where the source image contains cyan and magenta data in this portion. In this case, if the cell 28 is to be forensically marked, two drops of yellow colorant (indicated by the two rectangular markings) are deposited into pixel 62*a* along with the magenta and cyan drops (indicated by circular markings). Cell portion 70*c* illustrates the case where the source image contains yellow data in this portion. In this situation, no yellow forensic marking colorant will be added to that which will be deposited for the source image.

Because optical scanning can electronically separate yellow markings from cyan and magenta markings as will be discussed subsequently, forensic markings are detectable even where the forensic marking 20 is superimposed on a region of the source image containing cyan or magenta colorant. However, if the marking 20 is superimposed on a region containing yellow (or black, which contains yellow) colorant, the presence of extraneous yellow data in the scanned image will corrupt the forensic marking 20. If the location marker 26 is corrupted, the forensic marking may not be located at all. If the location marker 26 is valid but either or both of the information marker 22 and the checksum 24 are corrupted, then it is virtually certain that the checksum marker will not match the decoded information marker 22, and thus the corrupt nature of the marking will be detected so as to avoid misidentifying the printing system 10.

Figure 8:
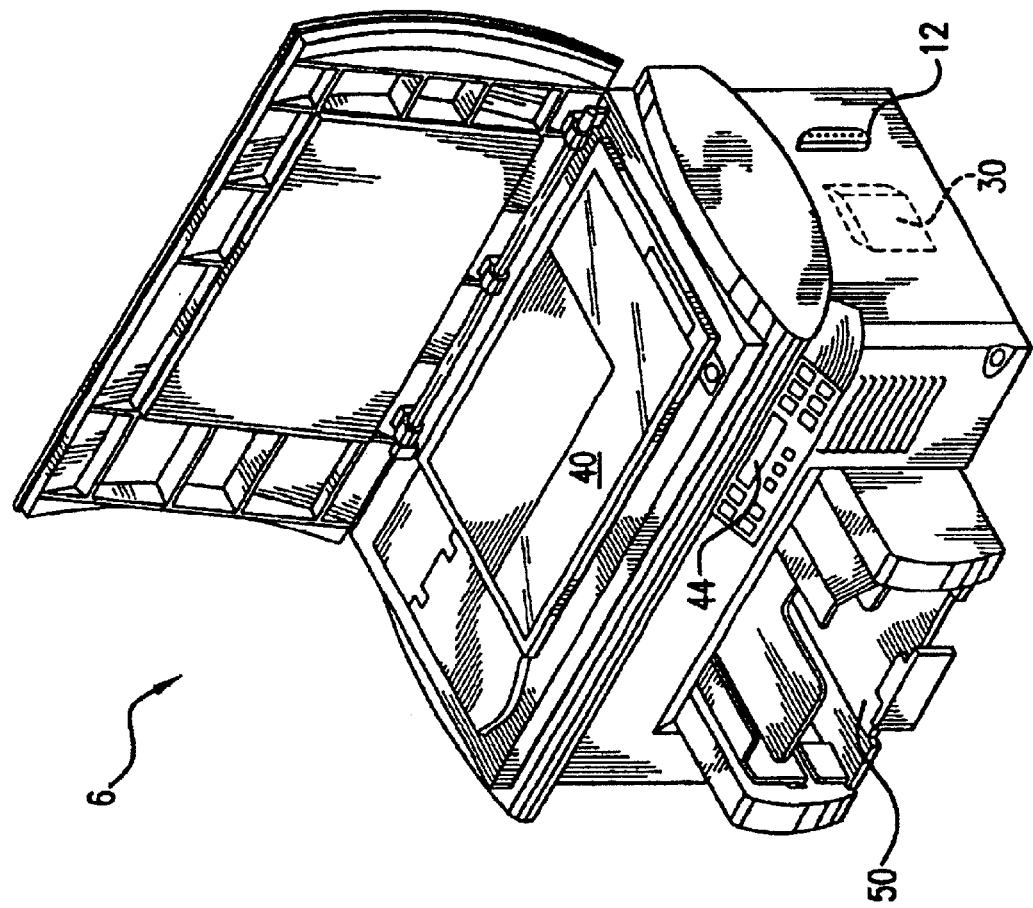
FIG. 8 is a perspective view of an All-in-One scanner/printer/copier device incorporating the passive marking printing system of FIG. 1
Figure 9:
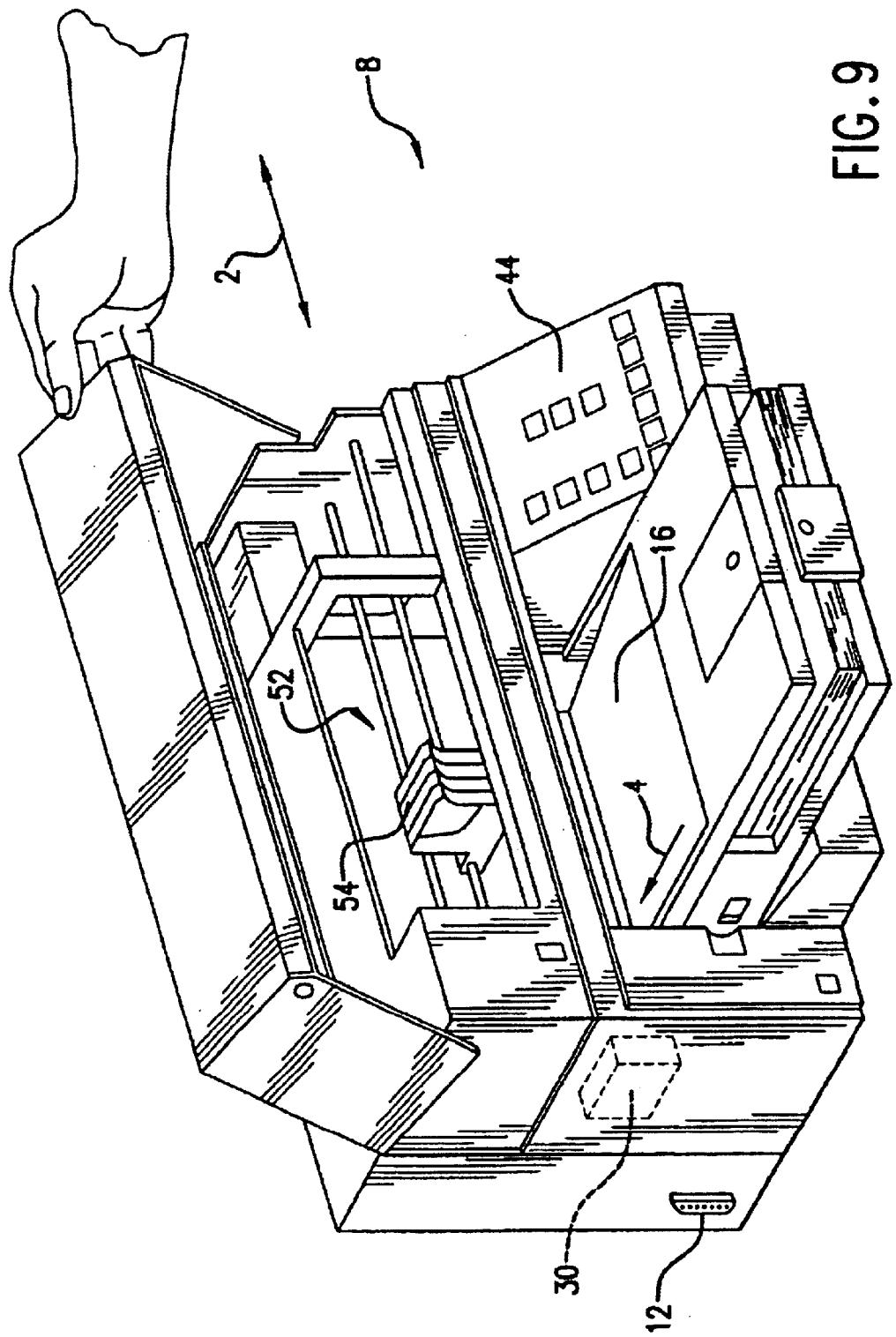
FIG. 9 is a perspective view of a color swath printer incorporating the passive marking printing system of FIG. 1

Considering now alternative packaging configurations for the printing system 10 of the present invention, and with reference to FIG. 8, the invention may be embodied in an "All-in-One" device 6 which incorporates the scanner 40, processor 30, and printer 50 so as to function as a stand-alone copier which may be operated from a control panel 44. The device 6 may also include a data interface 12 adapted to receive in electronic form source data corresponding to the source medium 17 containing the source image 18 to be copied. The scanner 40 may take the form of a flatbed scanner (illustrated) in which the source image 18 is placed in a fixed position on the media receptor 42 and the optical scanning elements are moved with respect to the medium 17. Alternatively, the scanner 40 may take the form of a sheet-feed scanner (not shown), in which the optical scanning elements are fixed and the medium 17 is moved with respect to the scanning elements. Alternatively, as best understood with reference to FIG. 9, the invention may be embodied in a printer 8 which does not contain a scanner 40 but which does incorporate the processor 30, printer 50, and data interface 12. In operation, the printer 8 receives in electronic form the source image 18 to be printed from a device, typically a computer, connected to the data interface 12. In yet another alternative embodiment of the printing system 10, both the scanner 40 and the printer 50 are separately packaged and connected to a computer (not shown) having the processor 30. While the just-described configurations are illustrative of the breadth of the present invention, they are not intended to limit its scope to just these configurations.

Figure 10:
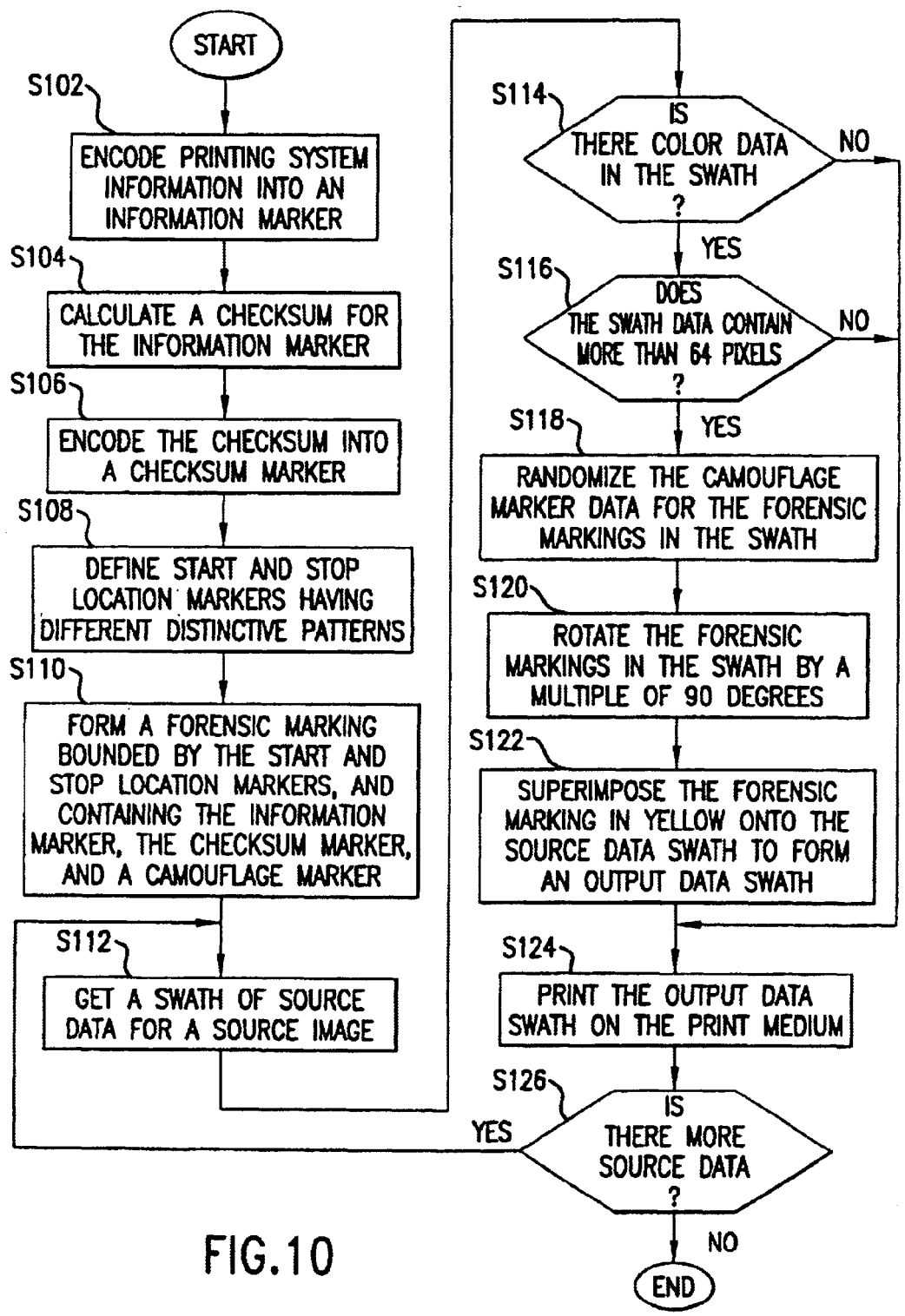
FIG. 10 is a flowchart of a method for printing a forensically marked image on a print medium 16 using the color swath printer of FIG. 9.

The present invention may also be implemented as a novel method for printing a forensically marked image on a print medium 16 using a color swath printer. The forensic markings 20 added to the source image 18 to be printed consists of a graphical pixel pattern formed by an arrangement of markers, each of which markers has a graphical pixel pattern. As best understood with reference to FIG. 10, the method begins with encoding S102 printing system information sufficient to identify the system 10 on which the print medium 16 was printed, described previously herein, into an information marker 22. Next, a checksum for the information marker 22 is calculated S104. The checksum preferably is the total number of cells 28 printed to encode the system information. For example, the information marker 22 of the forensic marking 20 of FIG. 3 has 32 possible cells that could be printed to represent the system information, so the checksum would have a value in the range of zero to thirty-two. According to the method, this checksum value is then itself encoded S106 into a checksum marker 24. Start 26a and stop 26b location markers which serve to delimit the area encompassed by forensic markings 20 are defined S108; each of these markers has a different distinctive graphical pixel pattern so that it can readily be identified. The graphical pixel pattern for the forensic marking 20 is then formed S110 with the start 26a and stop 26b markers bounding an area that includes the information marker 22, checksum marker 24, and a camouflage marker 29 whose contents can in some embodiments be determined dynamically at the time of printing so as to reduce the perceivability of the forensic markings 20 by the human eye due to replication on the print medium 16. After the forensic marking pattern is formed, at S112 the method next gets a swath of source data corresponding to the source image 18. Whether or not the forensic marking 20 gets added to the source data for printing depends on whether color data exists in the source data for the swath. In the preferred embodiment, if there is no color data in the swath, the swath will be printed using only black colorant in order to improve printing throughput (since printing black data typically requires fewer scans to fully print a swath), and thus taking the "No" branch of S114 will omit superimposing the forensic marking 20 onto the source data for the swath. Similarly, if the swath contains less than sixty-four pixels of data in the scan direction 2, taking the "No" branch of S116 will similarly omit superimposing the forensic marking 20 onto the source data for the swath, so as not to print only a partial forensic marking 20 in that swath. However, if the swath contains color data ("Yes" branch of S114) and that color data is more than sixty-four pixels in the scan direction 2 ("Yes" branch of S116), then at least one forensic marking 20 will be superimposed S122, preferably using yellow colorant, onto the source data for the swath to form an output data swath for printing S124 on the print medium. If there is more source data remaining to be printed as other swaths ("Yes" branch of S126), the method will get S112 the next swath of source data. If there is no more source data remaining to be printed ("No" branch of S126), the method ends. In some embodiments, the forensic markings 20 for certain swaths may be further modified before printing. At S118, randomized data may be inserted into the camouflage marker 29 to reduce the perceivability of the markings 20. Alternatively or in addition, each of the forensic markings 20 in the swath may be rotated S122 by a multiple of ninety degrees, which can also reduce the perceivability of the markings 20.

The processor 30, as best understood with reference to FIG. 1, includes modules which may be implemented in hardware, firmware, software, or any combination thereof to perform the above-described method. A forensic marking unit 31 receives the system information 32 and source data, and performs the calculation, encoding, randomization, rotation, and superimposition required to form the forensic markings 20 in the output data sent to the printer 50.

Other aspects of the present invention involve examination of the forensic markings 20 printed on a particular source medium 17. As best understood with reference to FIG. 1, the present invention may be implemented as a system 10 for identifying the printing device on which a particular medium 17 was printed via forensic markings 20 imprinted on the medium 17. The medium 17 is placed on the media receptor 42 and scanned by the scanner 40 to acquire multicolor electronic source data corresponding to the source image 18. The source data usually represents the primary colors red, green, and blue. The processor 30 processes the source data. The processor 30 has a color separation unit 33 coupled to the image scanner 40 for transforming and separating the primary color image data into data planes for each of the secondary colors cyan, magenta, and yellow. The processor also has a forensic identification unit 34 coupled to the color separation unit 33 and which receives the yellow color plane image data from the separation unit 33. The forensic identification unit 34 has a locator module 35 for scanning the yellow color plane data to locate data representative of a forensic marking 20 therein. The forensic identification unit 34 also has a validation subsystem for analyzing an individual forensic marking 20 by calculating a checksum for the information marker 22 of the marking 20, decoding the checksum marker 24 to determine the imprinted checksum, and comparing the calculated checksum versus the imprinted checksum; if the checksums match, the analyzed forensic marking 20 is valid. The forensic identification unit 34 further has an identification module 36 for decoding the information marker of a validated forensic marking 20 to determine the printing device on which the source medium 17 was printed.

Another embodiment of the present invention related to examination of the forensic markings printed on a particular source medium 17 is a printing system which modifies its operation if copy-prohibited subject matter is detected. As heretofore described, the information marker 22 may contain a "copy prohibit" control flag. In this embodiment, the forensic identification unit 34 analyzes the forensic markings 20 during copying of the document, and if the decoded information marker 22 indicates that the source image 18 should not be copied, the system 10 will not produce a copy. This capability is very useful in conjunction with controlled-copy documents for which unauthorized duplication is prohibited. Superimposing the information marker 22 on the original documents when they are printed will prevent them from being subsequently copied on the system 10.

From the foregoing it will be appreciated that the printing systems and methods provided by the present invention represent a significant advance in the art. A printer can be constructed according to the present invention so as to provide a forensic marking system that unobtrusively marks printed media with encoded system information. The encoded system information can subsequently identify the system on which the media were printed with a high degree of accuracy, even where the markings are superimposed on other image content. Although several specific embodiments of the invention have been described and illustrated, the invention is not to be limited to the specific methods, forms, or arrangements of parts so described and illustrated. In particular, the invention may be used with single pass swath printers where a swath is fully printed during a single pass of the printheads 54 over the print medium 16, or with multipass swath printers where multiple passes of the printheads 54 over the print medium 16 are required to fully print a swath. It can be used with all types of swath printers including band printers and drum printers. It can be practiced with all types of inkjet printers including those which use thermal and piezo printing technologies; and with non-swath or non-inkjet color printers such as color laser printers. The invention is limited only by the claims.

What is claimed is:

1. A system for printing a forensically marked image, comprising:
    a processor for superimposing onto source data at least one forensic marking so as to create output data corresponding to the forensically marked image, the at least one forensic marking having
        an information marker indicative of the system, and
        a checksum marker proximate the information marker and indicative of the information marker; and
    a printer coupled to the processor for printing the output data so as to produce the forensically marked image, the at least one forensic marking printed in a predetermined color having a low visual response to the human eye, but readily detectable by electronic scanning so as to identify the system.

2. The system of claim 1, wherein the forensic marker includes:
    at least one location marker indicative of a location of the forensic marking proximate the information marker and the checksum marker.

3. The system of claim 1, wherein a portion of the source data and a portion of the at least one forensic marking are printed in the same image pixels on a printed medium.

4. The system of claim 1, wherein the information marker identifies the system sufficiently to enable tracing of the forensically marked image to the system.

5. The system of claim 1, wherein the information marker indicates that copying of the forensically marked image is prohibited.

6. The system of claim 1, further including:
    a scanner coupled to the processor for acquiring the source data from a source image.

7. The system of claim 1, further including:
    a data interface coupled to the processor for receiving in electronic form the source data corresponding to a source image.

8. The system of claim 1, wherein the forensic marking further includes:
    at least one camouflage marker indicative of randomized data such that the visibility of the forensic markings due to replication on the forensically marked image is reduced.

9. The system of claim 2, wherein the forensic marking is rectangular, the forensic marking having
    a first location marker located at one corner of the forensic marking, and
    a second location marker different from the first location marker located at the diagonally opposite corner of the forensic marking.

10. The system of claim 9, wherein certain ones of the at least one forensic marking are rotated from certain others of the at least one forensic marking by a multiple of substantially 90 degrees, so as to reduce visual perceptibility of the pattern.

11. The system of claim 1, wherein the printer prints color images using cyan, magenta, and yellow colorant.

12. The system of claim 11, wherein the predetermined color is yellow.

13. The system of claim 12, wherein the forensic marking is an encoded pattern of yellow image pixels that is superimposed on source data which is printed with at least one of cyan, magenta, and yellow inks.

14. The system of claim 1, wherein each individual one of the at least one forensic marking is a rectangular array of image pixels.

15. The system of claim 14, wherein the rectangular array is a sixty-four pixel by sixty-four pixel matrix.

16. The system of claim 15, wherein the rectangular array is divided into sixty-four eight pixel by eight pixel cells.

17. The system of claim 16, wherein colorant is deposited during printing in a predetermined location in at most one pixel of each of the eight pixel by eight pixel cells, such that the image quality is not significantly degraded by the forensic marking.

18. The system of claim 17, wherein a maximum print density of the forensic marking within the rectangular array is less than five percent.

19. The system of claim 17, wherein a maximum print density of the forensic marking within the rectangular array is approximately 1.5 percent.

20. The system of claim 1, wherein an individual forensic marking is replicated in multiple locations on the forensically marked image.

21. The system of claim 20, wherein the multiple locations are at predetermined pixel-row and pixel-column intervals.

22. The system of claim 21, wherein the pixel-row and pixel-column intervals are 256 pixels.

23. The system of claim 22, wherein adjacent forensic markings are offset from each other by a predetermined number of pixel-rows.

24. The system of claim 23, wherein the predetermined number of pixel-rows is one.

25. The system of claim 6, further comprising:
   detection means coupled to the scanner for detecting whether the source image contains copy-prohibited subject matter, and
   control means responsive to the detection means and coupled to the printer for disabling the copying of the copy-prohibited subject matter.

26. A system for determining a device on which a printed medium was printed, comprising:
   a media receptor adapted to receive the printed medium;
   an image scanner in optical communication with the media handler for acquiring multicolor image data for the printed medium;
   a color separation unit coupled to the image scanner for segregating predetermined color image data from the multicolor image data; and
   a forensic identification unit coupled to the color separation unit for identifying in the predetermined color image data at least one forensic marking placed on the printed medium by the device, the forensic identification unit having
      a locator subsystem for locating an individual one of the at least one forensic marking within the predetermined color image data,
      a validation subsystem for analyzing the individual forensic marking so as to verify its integrity, and
      an identification subsystem for analyzing the individual forensic marking so as to identify the device on which the printed medium was printed.

27. A method for printing a forensically marked image with a printer, comprising:
   encoding system information identifying the printer into an information marker;
   calculating a checksum for the information marker;
   encoding the checksum into a checksum marker;
   superimposing onto source data at least one encoded forensic marking containing the information marker and the checksum marker so as to create output data corresponding to the forensically marked image; and
   printing the output data on a print medium so as to produce the forensically marked image, the at least one forensic marking printed using a predetermined color difficult to detect by the human eye, but readily detectable by electronic scanning so as to identify the system.

28. The method of claim 27, further comprising:
   adding to each of the at least one forensic markings at least one location marker indicative of a location of the forensic marking on the print medium.

29. The method of claim 28, wherein the at least one location marker is further indicative of the orientation of the forensic marking on the print medium.

30. The method of claim 27, wherein the printing the output data further includes
   printing the at least one forensic marking using yellow colorant.

31. The method of claim 27, further including:
   rotating at least some of the individual ones of the at least one forensic marking by a multiple of 90 degrees prior to the printing.

32. The method of claim 27, further including:
   adding to each of the at least one forensic markings at least one camouflage marker indicative of randomized data such that the visibility of the forensic markings due to replication on the print medium is reduced.

33. A method for printing a forensically marked image on a print medium with a swath printer, comprising:
   obtaining a swath of image data corresponding to a source image;
   if more than a threshold amount of color data exists in the swath of image data, superimposing onto the image data a swath of at least one forensic marking having an encoded pattern of image pixels in graphical form, the forensic marking including a checksum marker indicative of forensic marking validity;
   printing the image data on the print medium so as to generate a swath of the forensically marked image; and
   repeating the obtaining, superimposing, and printing until all the swaths of image data are printed.

34. The method of claim 33, wherein the threshold amount of color data is 64 pixels.

35. A method of determining the printing device on which a forensically marked image was printed, the forensically marked image having at least one forensic marking including an information marker indicative of the printing device and a checksum marker indicative of the information marker, comprising:
   scanning the forensically marked image to locate an individual one of the at least one forensic marking;
   calculating a calculated checksum for the information marker of the individual forensic marking;
   decoding the checksum marker of the individual forensic marking to determine a printed checksum; and
   if the calculated checksum matches the printed checksum, decoding the information marker to determine the printing device.

36. The method of claim 35, wherein the at least one forensic marking is of a predetermined color, and wherein the scanning includes:
   color separating the scanned image to isolate image information for the predetermined color.

37. A printer, comprising:
   an interface adapted for receiving printable image data;
   a processor for
      encoding system information identifying the printer into an information marker,
      calculating a checksum for the information marker,
      encoding the checksum into a checksum marker,
      combining the information marker and the checksum marker into a forensic marking, and
      superimposing onto the printable image data at least one copy of the forensic marking; and
   a print mechanism coupled to the processor for printing the printable image data in a graphic form detectable by electronic scanning but undetectable to the human eye.

* * * * *